United States Patent [19]

Lane et al.

[11] Patent Number: 4,585,572
[45] Date of Patent: Apr. 29, 1986

[54] REVERSIBLE PHASE CHANGE COMPOSITION FOR STORING THERMAL ENERGY

[75] Inventors: George A. Lane; Harold E. Rossow; Arthur S. Teot, all of Midland, Mich.

[73] Assignee: The Dow Chemical Company, Midland, Mich.

[21] Appl. No.: 540,726

[22] Filed: Oct. 11, 1983

[51] Int. Cl.$^4$ ............................................. C09K 3/18
[52] U.S. Cl. ................................. 252/70; 252/315.1; 252/315.2; 126/400; 126/452; 165/104.12
[58] Field of Search .................... 252/70, 315.1, 317, 252/315.2; 126/400, 452; 165/104.12

[56] References Cited

U.S. PATENT DOCUMENTS

| | | | |
|---|---|---|---|
| 3,986,969 | 10/1976 | Telkes | 252/315.5 |
| 4,003,426 | 1/1977 | Best et al. | 252/70 |
| 4,187,189 | 2/1980 | Telkes | 252/70 |
| 4,209,413 | 6/1980 | Kent et al. | 252/70 |
| 4,231,885 | 11/1980 | Rueffel | 252/70 |
| 4,426,409 | 1/1984 | Roe | 252/70 |

OTHER PUBLICATIONS

Derwent Abstract, Accession No. 81-41849D/23, Herrick et al., U.S. Pat. No. 4,267,879, 5/19/81.
"Solar Heat Energy: Latent Heat Material", vol. 1, pp. 19-20; 22-23; 26 & 28 (1983) George Lane.
Ashae Journal, M. Telkes, Solar Energy, pp. 38-45 (1974).

*Primary Examiner*—Amelia B. Yarbrough
*Attorney, Agent, or Firm*—Nis H. Juhl

[57] ABSTRACT

A reversible liquid/solid phase change composition for storing thermal energy. The composition comprises at least one hydrated inorganic salt selected from a salt or mixture of salts that are subject to segregation of its chemical components during repeated freezing and thawing cycles, and a surface active thickening agent in the form of a cationic surfactant and selected from an amine, salts of the amine, or a quaternary ammonium salt of the amine, wherein the thickening agent is present in the hydrated salt in an amount sufficient to form a micelle structure throughout the hydrated salt to prevent such segregation.

11 Claims, No Drawings

REVERSIBLE PHASE CHANGE COMPOSITION FOR STORING THERMAL ENERGY

BACKGROUND OF THE INVENTION

The invention generally relates to reversible liquid/solid phase change materials (PCMs) for storing thermal energy. More particularly, the invention relates to PCMs comprising a hydrated inorganic salt or mixture of salts which undergoes segregation of its chemical components during repeated freezing and thawing cycles, and a surface active thickening agent for preventing segregation of the hydrated inorganic salt components.

DESCRIPTION OF THE PRIOR ART

For some time, storage materials which undergo a change in phase have been employed as an attractive alternative to materials which store thermal energy as sensible heat such as, for example, by raising the temperature of water or rocks. In contrast, PCMs absorb a large quantity of latent heat during their phase change from the solid to the liquid and release it at a constant temperature as the process is reversed.

Considerable effort has been spent in identifying and testing suitable PCMs for the storage of thermal energy including the early work by Maria Telkes involving the storage of solar energy by the heat of fusion of suitable salt-hydrates and their eutectics such as, for example, sodium sulfate decahydrate —$Na_2SO_4.10H_2O$ (Glauber's salt). In ASHRAE Journal of September, 1974, pages 38–45, M. Telkes evaluated the thermal, physical and other properties of PCMs on the basis of economics, applicability, corrosion, toxicity, and availability for large scale installations.

Numerous other PCMs which store thermal energy as latent heat have been identified by G. A. Lane in Volume I of a book entitled "Solar Heat Storage: Latent Heat Materials", CRC Press, Boca Raton, Fl. 1983, pages 9–30.

Several classes of hydrated inorganic salts exist and can be generally divided into two groups:

(1) Salt hydrates that can go through many cycles of freezing and thawing without an appreciable separation of their chemical components. Such salt hydrates can be classified as congruent melting, quasi-congruent melting, congruent isomorphous, and eutectic salt hydrates, and (2) Salt hydrates which undergo an appreciable segregation of their chemical components during repeated cycles of freezing and thawing. Such salt hydrates can be classified as semi-congruent melting, incongruent melting, incongruent isomorphous, hypoeutectic and hypereutectic salt hydrates.

Salt hydrates of group (1) which are "congruent melting" are hydrated salt mixtures such as, for example, $CaBr_2.6H_2O$, for which, at the melting point, with solid and liquid phases in a stable equilibrium, the solid phase contains no hydrated $CaBr_2$ other than the hexahydrate and the liquid phase contains, for every mole of $CaBr_2$, six moles of water plus sufficient water to form the stable hydrate of any additive materials in solution.

"Quasi-congruent" melting salt hydrate; such as, for example, $MgCl_2.6H_2O$ is a semi-congruent melting salt hydrate which freezes to the metastable stoichiometric crystalline hydrate, without formation of a stable lower hydrate and melts reversibly, mimicking the behavior of a congruent melting salt hydrate.

Congruent isomorphous salt hydrate is a mixture of salt hydrate components that are fully miscible in the crystalline state in which the mixture has either 1) a minimum melting point below that of all the components and other mixtures, or (2) a maximum melting point above that of all the components and other mixtures. A congruent isomorphous salt hydrate is, for example, a mixture of 38.5 weight percent $CaCl_2.6H_2O$ and 61.5 weight percent $CaBr_2.6H_2O$.

Eutectic salt hydrates are mixtures of two or more components mixed in such a ratio that the melting point of the mixture is lower than that of any component and the entire mixture at one and the same temperature passes from the solid form into the liquid form and vice versa. An example of a eutectic salt hydrate is one comprising 58.7 weight percent $Mg(NO_3)_2.6H_2O$ and 41.3 weight percent $MgCl_2.6H_2O$.

In some cases, there is no satisfactory PCM in group (1) for a given application and the practitioner must choose a material from group (2). For example, greenhouses or hothouses often operate at a temperature of from 15° to 25° C., but at times there is not enough solar energy to melt a PCM, i.e. a modified $CaCl_2.6H_2O$ which has a phase transition temperature of 27° C. Thus, a PCM melting at a temperature of from 18° to 22° C. is more desirable. However, there is no PCM which is completely satisfactory among those PCMs in group (1) which melt in this temperature range. Accordingly, a PCM from group (2) can be selected but must be stabilized to prevent chemical separation of its components. It is the stabilization of such PCMs which is the object of this invention.

Salt hydrates of the type herein under consideration are those hydrated inorganic salts of the class hereinbefore identified in group (2) all of which undergo transition to the anhydrous or a less hydrated form at a characteristic temperature on heating and which revert to the more hydrated form on cooling at equilibrium.

A "semi-congruent melting" PCM of group (2) has two or more hydrate forms with differing solid compositions and melting points. Such PCMs can be transformed into other hydrate forms before either complete melting or freezing occurs, resulting in a broadened melting point range. In addition, there is a temporary loss in thermal energy storage capacity. Sodium thiosulfate pentahydrate ($Na_2S_2O_3.5H_2O$) is an example of a semi-congruent melting PCM.

"Incongruent melting" PCMs yield two distinct phases on melting, i.e., a saturated solution and a precipitate of an insoluble anhydrous salt. If the precipitate settles out of the solution, the anhydrous salt will not hydrate completely upon cooling and some thermal energy storage capacity will be lost with each freeze/melting cycle. Accordingly, incongruent melting, as observed with sodium sulfate decahydrate, for example, is a serious problem because it can result in a continual loss of latent heat storage capacity.

An "incongruent isomorphous" salt hydrate is a mixture of salt hydrate components that are fully miscible in the crystalline state, other than a congruent isomorphous salt hydrate. An incongruent isomorphous salt hydrate is, for example, a mixture of 46.0 weight percent $CaCl_2.6H_2O$ and 54 weight percent $CaBr_2.6H_2O$.

Mixtures of components which form a eutectic other than the eutectic composition are either "hypereutectic" or "hypoeutectic" hydrated salt mixtures in which the hypereutectics contain more, and the hypoeutectics contain less of the principal component than the eutectic composition. Mixtures of $Mg(NO_3)_2.6H_2O$ and $MgCl_2.6H_2O$ compositions other than the eutectic form the hypereutectic or hypoeutectic salt hydrates.

In "Solar Energy Storage"; ASHRAE Journal of September, 1974, M. Telkes, reported on the performance of experiments with various thickening agents as additives, with the aim of producing a PCM in which the anhydrous salt, i.e., sodium sulfate, could not settle out by gravity. Many different thickening agents were tested including such materials as woodshavings, sawdust, paper pulp, various types of cellulosic mixtures and methocel. Additional organic materials were tested including starches and alginates. Inorganic materials tested included silica gel, diatomaceous earth and finely divided silica products. M. Telkes also reported that some of these materials performed quite well for a number of cycles but that the silica gel, formed in the mixture itself, proved to be a hindrance in filling the mixture in containers because it thickened too rapidly. Moreover, some of the silica material combined with the borax nucleator and inhibited the nucleating capability of borax. None of the materials tested by M. Telkes has shown itself to be an effective agent for preventing segregation, i.e. for preventing gross movement of insoluble solids which are formed during, e.g. incongruent melting of the PCM. Thickening materials generally inhibit but do not always prevent movement of insoluble solids due to an increase in the viscosity of the composition. Accordingly, such thickening agents usually fail in time and segregation of the components of the PCM occurs.

Organic thickening agents which are natural polymers or derivatives thereof have been found to be unstable to hydrolysis and to bacterial and enzymatic action, all of which have the effect of shortening the lifetime of such organic thickening agents. Inorganic thickening agents, although more stable, generally are used only in containers of shallow depth, e.g., about one inch or less in depth, and are disposed in a horizontal position.

Another solution to the problem of providing a stable thickening material for PCMs is proposed by P. Kent et al. in U.S. Pat. No. 4,209,413. Kent et al. propose a PCM which is stable to hydrolysis and biological breakdown in which a hydrated inorganic salt is dispersed in a hydrogel formed from a water-soluble synthetic polymer having pendant carboxylic or sulfonic acid groups cross-linked with cations of a polyvalent metal.

As reported by Kent et al., an advantage of the material is that the hydrated inorganic salt is immobilized and maintained in close proximity and in small volumes throughout the hydrogel. This gelled composition minimizes any segregation of its components which could arise, after fusion of the hydrate phase, by any solid sinking to the bottom of the mixture. The synthetic polymers proposed by Kent et al. form a rubbery gel-like matrix containing the PCM and although the matrix provides for a more stable PCM, a large amount of the matrix-forming polymer is required which substantially raises the cost of the PCM. A further drawback in the use of synthetic polymers is that the heat storage capacity of the PCM is lowered and that the convective heat transfer of the PCM is inhibited. Kent et al. report that the PCM can be prepared in situ by reaction between the respective water-soluble polymer and a water-soluble salt of the polyvalent metal. However, this requires that the container for the PCM must be filled before the matrix is fully formed or cured.

Thickening agents of the class used herein are disclosed in a copending Patent application by A. S. Teot et al., Ser. No. 456,161, filed Jan. 6, 1983, the teachings of which are specificallly incorporated herein by reference. A. S. Teot et al. disclose an aqueous, high density, wellbore service fluid comprising water, a water-soluble salt having a density of at least 15 lbs/gal., and a thickening agent soluble in the fluid to increase the viscosity of the fluid to a predetermined level. The thickening agent employed in the high density fluid is an amine, salts of the amine, or a quaternary ammonium salt of said amine. The water-soluble salt consists essentially of calcium chloride, calcium bromide; zinc bromide, or mixtures thereof.

SUMMARY OF THE INVENTION

The present invention resides in a thermal energy storage material which comprises at least one hydrated inorganic salt having a phase change transition temperature in the range of from greater than about 0° up to about 140° C., wherein said hydrated inorganic salt or mixture of salts undergoes segregation of its chemical components during repeated cycles of freezing and thawing, and a surface active thickening agent in the form of a cationic surfactant and used in an amount sufficient to form a micelle structure throughout the storage material to prevent said segregation.

DEFINITIONS

The term "micelle structure" herein used designates a system of electrically charged colloidal particles or ions, consisting of oriented molecules.

The term "supercooling" refers to a discrepancy between the temperature at which freezing initiates and the melting temperature of a given liquid/solid phase change material when cooled and heated under quiescent conditions.

DETAILED DESCRIPTION OF THE INVENTION

Numerous PCMs have been identified with phase transition temperatures (PTT) extending over a wide range of from as low as about 0° C. to as high as about 180° C. One such PCM is described in co-pending application Ser. No. 504,763, filed June 15, 1983, (G. A. Lane et al.). The application discloses a PCM comprising an admixture of hydrated $CaBr_2$ and $CaC_{12}$ and additionally includes a modifier selected from KBr, KCl, or mixtures thereof. The (PTT) of this PCM, depending on the respective amounts of the salts present in the PCM varies from about 7° C. to about 50° C. Other segregating PCM's having a (PTT) above 5° C. are, for example, $MgCl_2.2H_2O$ which is semi-congruent melting and which has a (PTT) of 181.5° C. and $SrCl_2.2H_2O$ which is semi-congruent melting has a (PTT) of 134.4° C. A segregating PCM having a (PTT) below 50° C. is, for example, $Cd(NO_3)_2.9H_2O$ which is semi-congruent melting and which has a (PTT) of 3.5° C.

Numerous other inorganic PCMs and their transition temperatures are listed in Volume I of "Solar Heat Storage", by G. A. Lane; CRC Press, Inc., 1983. Many of the hydrated salts referred to in this publication are PCMs of group (2), in supra, which undergo segregation of their chemical components during repeated cycles of freezing and thawing.

The present invention provides a solution to the problem of segregation of chemical components in semi-congruent melting, incongruent melting, and incongruent isomorphous salt hydrates. According to the present invention, a particular type of surface active thickening agent is added to the inorganic PCM creating a micelle structure throughout the PCM. An advantage of the addition of this thickening agent to a PCM is that only a small amount of the thickening agent, as an additive, is needed compared to the thickening and gelling agents hereinbefore described. A further advantage is that a PCM having added thereto the surface active thickening agent of the present invention, thins when subjected to shear or an elevated temperature, so that it can be more readily poured or pumped from one container to another container. As previously alluded to, thinning of the PCM of the present invention under shear is highly desirable since it allows mixing of a large quantity of the PCM, including the thickening agent, and subsequent pouring of the PCM from a large mixing tank into smaller containers or panels which can then be installed on location, i.e., at the building site, the hothouse, or the like.

The surface active thickening agent employed in the present invention is selected from an amine (primary, secondary or tertiary), a salt of such amine, or a quaternary ammonium salt of such amine, including heterocyclic amine salts or quaternary ammonium salts wherein the nitrogen atom is present in a five- or six-member ring structure.

Useful amines include those corresponding to the formula:

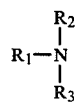

wherein
$R_1$ is an aliphatic group having from about 16 to about 26 carbon atoms, wherein said aliphatic group may be branched or straight chain and may be saturated or unsaturated. The maximum number of carbons in the $R_1$ group is primarily dependent on the type of $R_2$ and $R_3$ groups, and the concentration of the water-soluble salt; preferably $R_1$ contains no more than about 26 carbon atoms.

$R_2$ and $R_3$ are independently hydrogen or a $C_1$ to about $C_6$ aliphatic group which can be branched or straight chained, saturated or unsaturated, and which may be substituted with a hydrophilic group which will render the $R_2$ and/or $R_3$ group more hydrophilic such as, for example, by replacing one or more hydrogen atoms with an —OH and/or amide group. $R_2$ and $R_3$ groups containing a hydrophilic substituent are preferred in hydrated salts having higher electrolyte concentrations because they increase the electrolyte compatibility of the surface active agent.

Salts of such amines which can be employed correspond to the formula:

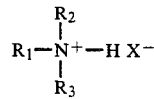

wherein $R_1$, $R_2$ and $R_3$ are the same as defined directly hereinbefore and X is an inorganic or organic salt forming anion.

Quaternary ammonium salts of the amines which can be employed in the present invention correspond to the formula

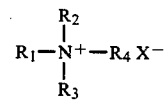

wherein $R_1$, $R_2$, $R_3$ and $X^-$ are the same as hereinbefore defined and $R_4$ can independently constitute the same group as $R_2$ or $R_3$ except that none of $R_1$, $R_2$, $R_3$ or $R_4$ are hydrogen. In addition, the $R_2$, $R_3$ and $R_4$ groups may be formed into a heterocyclic ring structure which includes the nitrogen atom of the amine.

Preferably, $X^-$ is an inorganic anion such as a sulfate, nitrate, perchlorate or halide. A halide, (Cl, Br or I) is preferred, Cl and Br being most preferred. $X^-$ may also be an aromatic organic anion such as salicylate, naphthalene sulfonate, p and m chlorobenzoates, 3,5- and 3,4- and 2,4-dichlorobenzoates, t-butyl and ethyl phenates, 2,6- and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate, toluene sufonate $\alpha\beta$-naphthols, p,p'bisphenol A. The thickening agent should be chosen such that the anion is compatible with the electrolyte present in the hydrated salt such that undesirable precipitates are not formed. Also, the specific anion chosen will depend to some degree on the specific amine structure.

The surface active thickening agent is employed in an amount which is sufficient to increase the viscosity of the PCM by at least 50 percent over the viscosity thereof without the addition of the thickening agent as measured, for example, on a Haake Rotovisco viscometer at a temperature of about 20° C. and a shear rate of 160 sec$^{-1}$.

The exact quantity and the particular thickening agent or mixture of agents to be employed will vary somewhat depending on the specific PCM employed, the viscosity desired, the temperature of use, the pH of the solution, and other similar factors. The concentration of the thickening agent generally ranges from about 0.05 to about 5 weight percent, preferably from about 0.2 to about 3 weight percent, most preferably from about 0.5 to about 2.0 weight percent of the PCM. Simple laboratory procedures can be employed to determine the optimum conditions for any particular set of parameters. For example, when a non-protonated amine is employed as the surface active thickening agent, the pH of the PCM can affect to some degree the effectiveness of particular amines. More acidic PCMs are required for some amines to be dissolved therein. It is thought that this is because the amine must become protonated before it will become effectively dissolved in the fluid.

Examples of surface active thickening agents which can be employed include oleyl methyl bis(hydroxyethyl) ammonium chloride; oleyl-bis-(2-hydroxyethyl)amine; erucyl-bis-(2-hydroxyethyl)-methyl ammonium chloride; hexadecyl-bis-(2-hydroxyethyl)-methyl ammonium chloride; octadecyl methyl bis(hydroxyethyl) ammonium bromide; octadecyl tris(hydroxyethyl) ammonium bromide; octadecyldimethylhydroxyethyl ammonium bromide; cetyl dimethyl hydroxyethyl ammonium bromide; cetyl methyl bis(hydroxyethyl)ammonium salicylate; cetyl methyl bis(hydroxyethyl)ammonium 3,4-dichlorobenzoate; cetyl tris(hydroxyethyl)ammonium iodide; bis(hydroxyethyl) soyaamine; N-methyl, N-hydroxyethyl tallow amine; bis(hydroxyethyl)octadecylamine; cosyl dimethylhydroxyethyl ammonium bromide; cosyl methyl bis(hydroxyethyl) ammonium chloride; cosyl tris(hydroxyethyl) ammonium bromide; docosyl dimethylhydroxyethyl ammonium bromide; docosyl methyl bis(hydroxyethyl)ammonium chloride; docosyl tris(hydroxyethyl)ammonium bromide; hexadecyl ethyl bis(hydroxyethyl)ammonium chloride; hexadecyl isopropyl bis(hydroxyethyl)ammonium iodide; N,N-dihydroxypropyl hexadecylamine; N-methyl, N-hydroxyethyl hexadecylamine; N,N-dihydroxyethyl octadecylamine; N,N-dihydroxypropyl oleylamine; bis(2-hydroxyethyl)-erucylamine; N,N-dihydroxypropyl soya amine; N,N-dihydroxypropyl tallow amine; N-butyl hexadecyl amine; N-hydroxyethyl octadecylamine; N-hydroxyethyl cosylamine; cetylamine; N-octadecyl pyridinium chloride; N-soya-N-ethyl morpholinium ethosulfate; methyl-1-oleyl amido ethyl-2-oleyl imidazolinium-methyl sulfate; methyl-1-tallow amido ethyl-2-tallow imidazolinium-methylsulfate.

It has been found that as the concentration of the hydrated salt increases the thickening agent should be more hydrophobic as long as solubility is maintained. This can be achieved by employing a thickening agent having a specific combination of $R_1$ and $R_2$-$R_4$ groups to provide a proper hydrophobic lipophilic balance. It has also been found that the $X^-$, component of the thickening agent affects, to some degree, the effectiveness of the agent in specific PCMs. For example, organic anions ($X^-$) generally are found to function more effectively in lower density fluids, e.g., less than about 49 weight percent $CaBr_2$, because of their solubility. Thickening agents having an inorganic anion constituent are generally more effective over a broader composition range than are thickening agents containing an organic anion.

To prepare the PCMs of the present invention, the surface active thickening agent is added to the hydrated salt. Standard mixing procedures known in the art can be employed since heating of the PCM and special agitation conditions are normally not necessary. It has been found preferable, in some instances, to dissolve the thickening agent into a lower molecular weight alcohol prior to mixing it with the hydrated salt. The lower molecular weight alcohol (e.g., isopropanol) functions as an aid to solublize the thickening agent. Other well known solubilizing agents can also be employed.

The following Examples 1 and 2 are illustrative of a particular PCM based on $CaCl_2$, $CaBr_2$, KBr, KCl, and water. Certain of these PCMs, having 6 moles of water for each gram atom of calcium, are congruent-melting and do not segregate. Others are not fully congruent-melting and, when subjected to repetitive cycles of freezing and melting, develop a composition gradient. The surface active thickening agent of the present invention is capable of forming a micelle structure which effectively prevents such segregation of the PCM components.

Test 1

A PCM of the following composition was prepared:

| | |
|---|---|
| $CaBr_2$ | 48.03 weight percent |
| $CaCl_2$ | 11.63 weight percent |
| KBr | 1.67 weight percent |
| KCl | 0.45 weight percent |
| $SrCl_2$ | 0.28 weight percent |
| $SrBr_2$ | 0.08 weight percent |
| NaBr | 0.22 weight percent |
| NaCl | 0.05 weight percent |
| $H_2O$ | remainder up to 100 weight percent |

This sample composition was tested by alternately freezing at 0° C. and melting at 45° C. in an air bath, while recording the temperature of the sample. Desirably, stable PCMs, e.g., PCMs which are congruent melting, drop in temperature during freezing until the phase transition temperature is reached, remain at that temperature until the material is frozen, and then again drop in temperature. During melting, the process is reversed. A sample of the PCM of the above composition showed this desirable behavior for about six freeze-melt cycles, freezing and melting at 19° C. However, thereafter temperature plateau at 19° C. became shorter and more sloping, vanishing after 26 cycles. This phenomenon was accompanied by a segregation of the sample composition. This test illustrates that this PCM, without a surface active agent which is capable of forming a micelle structure throughout the PCM, will initially show a good freeze-melting behavior but will begin to segregate after a few freeze-thaw cycles.

EXAMPLE 1

A sample of the same hydrated salt composition as used in Test 1 was prepared. To 100 grams of this sample was added 1.3 grams of a mixture of 10 weight percent isopropanol as a thinner in 90 weight percent quaternary surfactant (thickening agent) and was blended into the hydrated salt composition. The surfactant, an ethoxylated quaternary alkylene amine had the following structure.

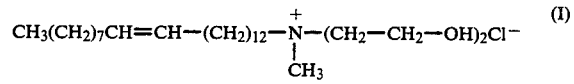

$$CH_3(CH_2)_7CH = CH - (CH_2)_{12} - \overset{+}{\underset{CH_3}{N}} - (CH_2 - CH_2 - OH)_2 Cl^- \qquad (I)$$

The PCM took on a thickened and gelled consistency, indicating an extensive formation of micelle structures in the PCM. When subjected to over 200 freeze-thaw cycles at a temperature of 0° C. and 45° C., this PCM maintained its freezing plateau at 19° C. and did not segregate. This example of the invention shows that the addition of the micelle-forming surface active thickening agent stabilizes the PCM and prevents segregation of its components.

EXAMPLE 2

A sample of the same hydrated salt composition used in Test 1 was prepared and blended with a mixture of an amine and a quaternary amine. To 100 grams of the salt composition was added 1.5 grams of an ethoxylated quaternary alkylene amine of the following formula:

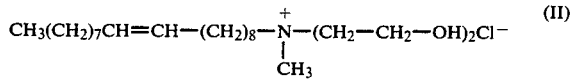

and 0.5 grams of the corresponding amine of the following formula:

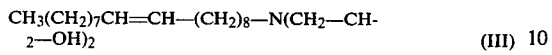

This example of the invention also showed that the addition of the surface active agent to the hydrated salt composition caused a thickening of the PCM which when subjected to the same freeze-thaw cycles as in Example 1, showed stability for more than 20 cycles, i.e., without segregation of the salt components.

Test 2

A further sample of the following hydrated salt composition was prepared:

| | |
|---|---|
| $CaCl_2$ | 33.3 weight percent |
| $MGCl_2$ | 9.4 weight percent |
| $H_2O$ | remainder, up to 100 weight percent |

This salt composition was tested by repetitive freezing at a temperature of 6° C. and melting at 35° C. in a water bath. After four cycles, the composition began to segregate, with increased separation of the salt components on subsequent cycles. This composition is a semi-congruent melting material which is also prone to segregation, as demonstrated in this test.

EXAMPLE 3

A sample of the same hydrated salt composition Test 2 was prepared and blended with a mixture of amine and quaternary amine surfactants. To a 100 gram sample of the hydrated salt composition was added 1.5 grams of a mixture of 10 weight percent isopropanol and 90 weight percent of the ethoxylated quaternary alkylene amine as defined in Formula (I), and 0.5 grams of a surfactant mixture of 25 weight percent isopropanol and 75 weight percent of a surfactant of the following formula:

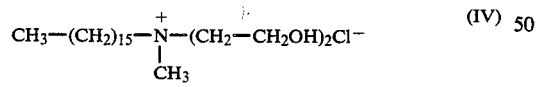

The resulting PCM was blended and took on a thickened or gelled consistency, again indicating an extensive formation of micelle structures in the PCM. The PCM was then subjected to the same freeze-thaw cycling procedure described hereinabove and was found to be stable for over 60 cycles, with no segregation of the PCM having been observed. This example of the invention again shows that the addition of the micelle-forming additive stabilizes the PCM against segregation.

What is claimed is:

1. A thermal energy storage material comprising at least one hydrated inorganic salt having a phase change transition temperature in the range of from greater than about 0° C. to about 140° C., wherein said hydrated inorganic salt or mixture of salts undergoes segregation of its chemical components during repeated cycles of freezing and thawing, and a surface active thickening agent in an amount sufficient to form throughout the storage material a micelle structure of the type that thickens the storage material to prevent said segregation, wherein said surface active thickening agent is selected from the group consisting of:

(a) an amine corresponding to the formula

wherein
$R_1$ is an aliphatic group having from about 16 to about 26 carbon atoms wherein said aliphatic group may be branched or straight chained and may be saturated or unsaturated;
$R_2$ and $R_3$ are each independently, hydrogen or a $C_1$ to about $C_6$ aliphatic group which may be branched or straight chained, saturated or unsaturated and which may be substituted with a group which renders the $R_2$ and/or $R_3$ group more hydrophilic;

(b) salts of said amine corresponding to the formula

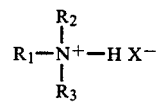

wherein
$R_1$, $R_2$ and $R_3$ are the same as defined hereinbefore and $X^-$ is an inorganic or organic salt forming anion; or (c) a quaternary ammonium salt of said amine corresponding to the formula

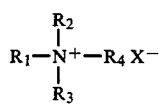

wherein
$R_1$, $R_2$, $R_3$ and $X^-$ are the same as hereinbefore defined and $R_4$ independently constitutes a group which has previously been set forth for $R_2$ and $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic five- or six- member ring structure which includes the nitrogen atom of the amine.

2. The storage material of claim 1 wherein said surface active agent is employed in an amount of from about 0.05 to about 5 percent by weight of the storage material.

3. The storage material of claim 1, wherein said hydrated inorganic salt is selected from salts which are semi-congruent melting, incongruent melting, incongruent isomorphous salt hydrates or mixtures which are hypereutectic or hypoeutectic mixtures.

4. The storage material of claim 1, wherein the thickening agent comprises at least one member selected from the group consisting of oleyl methyl bis(2-hydroxyethyl)ammonium chloride; erucyl-bis-(2-hydroxyethyl)-methyl ammonium chloride;

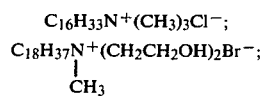

bis(2-hydroxyethyl)oleylamine; bis(2-hydroxyethyl)erucylamine; bis(2-hydroxyethyl)soyaamine; bis(2-hydroxyethyl)tallowamine; bis(2-hydroxyethyl)octadecylamine; $C_{22}H_{45}(CH_3)_2N^+CH_2OHBr^-$ and $C_{20}H_{41}(CH_3)_2N^+CH_2CH_2OHBr^-$.

5. The storage material of claim 1, wherein $X^-$ is $Cl^-$ or $Br^-$.

6. The thermal energy storage material of claim 1, wherein said surface active thickening agent is added in an amount sufficient to increase the viscosity of the storage material by at least 50 percent.

7. A method of storing energy comprising the steps of preparing a reversible liquid/solid phase change composition having a phase change transition temperature in the range of from greater than about 0° C. to about 140° C., selecting said composition from at least one hydrated inorganic salt or mixture of salts which undergoes segregation of its chemical components during repeated cycles of freezing and thawing, and adding a surface active thickening agent in an amount sufficient to form, throughout the hydrated salt, a micelle structure of the type that thickens the storage material to prevent segregation of the inorganic salt components, wherein said surface active thickening agent is selected from the group consisting of:

(a) an amine corresponding to the formula

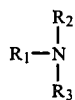

wherein $R_1$ is an aliphatic group having from about 16 to about 26 carbon atoms wherein said aliphatic group may be branched or straight chained and may be saturated or unsaturated;

$R_2$ and $R_3$ are each independently, hydrogen or a $C_1$ to about $C_6$ aliphatic group which may be branched or straight chained, saturated or unsaturated and which may be substituted with a group which renders the $R_2$ and/or $R_3$ group more hydrophilic; (b) salts of said amine corresponding to the formula

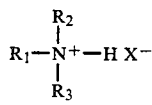

wherein $R_1$, $R_2$ and $R_3$ are the same as defined hereinbefore and $X^-$ is an inorganic or organic salt forming anion; or (c) a quaternary ammonium salt of said amine corresponding to the formula

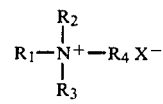

wherein $R_1$, $R_2$, $R_3$ and $X^-$ are the same as hereinbefore defined and $R_4$ independently constitutes a group which has previously been set forth for $R_2$ and $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic five- or six- member ring structure which includes the nitrogen atom of the amine, introducing the phase change composition into an encapsulating means for use as an energy storage device, and hermetically sealing the encapsulating means to prevent the escape of water vapor from the encapsulating means.

8. The method of claim 7, wherein the surface active thickening agent is added to the hydrated salt prior to encapsulation in the encapsulating means.

9. The method of claim 7, wherein the surface active thickening agent is added to the hydrated salt within the encapsulating means and prior to hermetic sealing of the encapsulating means.

10. An energy storage device comprising an encapsulating means having a reversible liquid/solid phase change composition hermetically sealed in said encapsulating means to prevent the evaporation of water from the composition, said composition comprising at least one hydrated inorganic salt having a phase transition temperature of from greater than about 0° C. to about 140° C., said salt being selected from salts or mixture of salts which undergo segregation of their chemical components during repeated cycles of freezing and thawing, and a surface active thickening agent in an amount sufficient to form, throughout the storage material, a micelle structure of the type that thickens the storage material to prevent said segregation, wherein said thickening agent is selected from the group consisting of:

(a) an amine corresponding to the formula

wherein $R_1$ is an aliphatic group having from about 16 to 26 carbon atoms, and wherein said aliphatic group may be branched or straight chained and may be saturated or unsaturated;

$R_2$ and $R_3$ are each independently, hydrogen or a $C_1$ to about $C_6$ aliphatic group which may be branched or straight chained, saturated or unsaturated and which may be substituted with a group which renders the $R_2$ and/or $R_3$ group more hydrophilic;

(b) salts of said amine corresponding to the formula

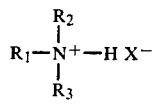

wherein
$R_1$, $R_2$ and $R_3$ are the same as defined hereinbefore and $X^-$ is an inorganic or organic salt forming anion; or
(c) a quaternary ammonium salt of said amine corresponding to the formula

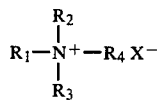

wherein
$R_1$, $R_2$, $R_3$ and $X^-$ are the same as hereinbefore defined and $R_4$ independently constitutes a group which has previously been set forth for $R_2$ and $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic five- or six- member ring structure which includes the nitrogen atom of the amine.

11. The energy storage device of claim 10, wherein the thickening agent is added in an amount of from 0.05 to 5 percent by weight of the storage material and comprises at least one member selected from the group consisting of oleyl methyl bis(2-hydroxyethyl)ammonium chloride; erucylbis-(2-hydroxyethyl)-methyl ammonium chloride;

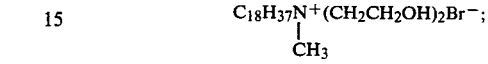

bis(2-hydroxyethyl)oleylamine; bis(2-hydroxyethyl)-erucylamine; bis(2-hydroxyethyl)soyammine; bis(2-hydroxyethyl)tallowamine; bis(2-hydroxyethyl)octadecylamine; $C_{22}H_{45}(CH_3)_2N^+CH_2CH_2OHBr^-$ and $C_{20}H_{41}(CH_3)_2N^+CH_2CH_2OHBr^-$.

* * * * *